United States Patent [19]

Bubnich et al.

[11] 4,145,681

[45] Mar. 20, 1979

[54] VEHICLE PARKING GUIDE AND ELECTRICAL SIGNALING DEVICE

[76] Inventors: Frank J. Bubnich; Marketta A. Bubnich, both of 3224 Emmaus, Zion, Ill. 60099

[21] Appl. No.: 842,228

[22] Filed: Oct. 14, 1977

[51] Int. Cl.$^2$ ............................................. G08G 1/14
[52] U.S. Cl. ...................................... 340/51; 340/61
[58] Field of Search ................... 340/51, 61; 200/61.83

[56] References Cited

U.S. PATENT DOCUMENTS

| | | | |
|---|---|---|---|
| 2,454,896 | 11/1948 | Traub | 340/61 |
| 3,219,972 | 11/1975 | Williams | 340/61 |
| 3,820,065 | 6/1974 | Koplewicz et al. | 340/51 |

Primary Examiner—Donald J. Yusko

Attorney, Agent, or Firm—Merriam, Marshall & Bicknell

[57] ABSTRACT

A parking guide and signaling device for cars and trucks to assist the driver parking a vehicle in a designated parking area comprising a housing section having a window in the front wall thereof which is closed by a pane of translucent sheet material through which indicia can be seen clearly when the indicia are illuminated from the rear surface of the pane by an electric light with electrical means within the housing for illuminating said pane and the housing section having pivotally mounted thereon an actuating lever biased so that the electric means is normally "off" but when the vehicle moves into a designated parking area the electrical means is turned "on" and an intense beam of light illuminates the inner surface of said pane.

1 Claim, 6 Drawing Figures

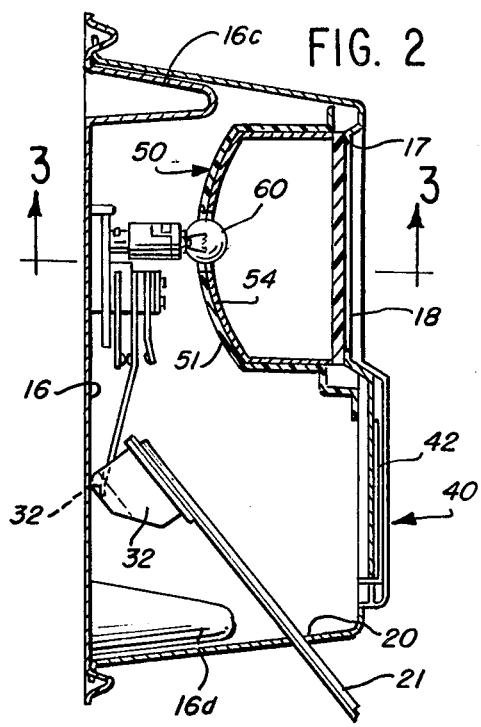
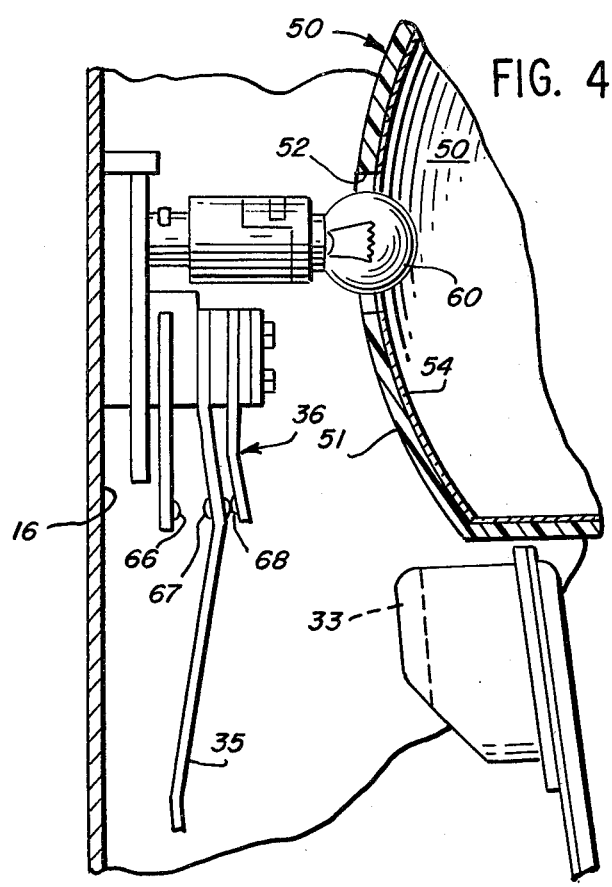
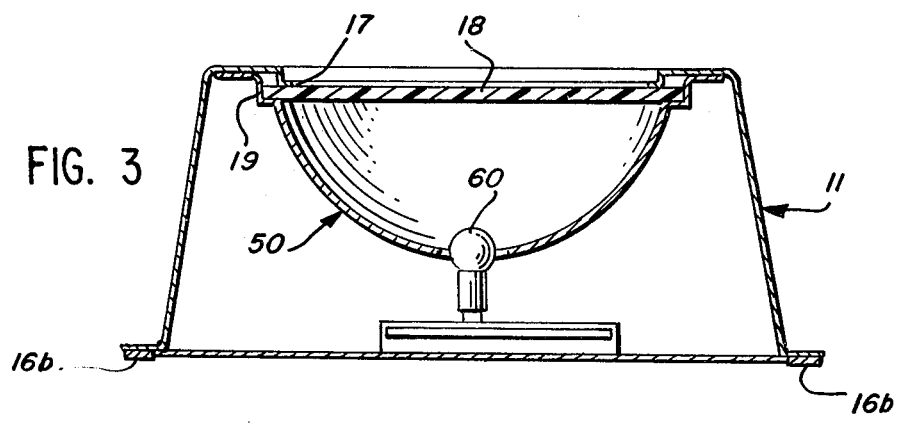
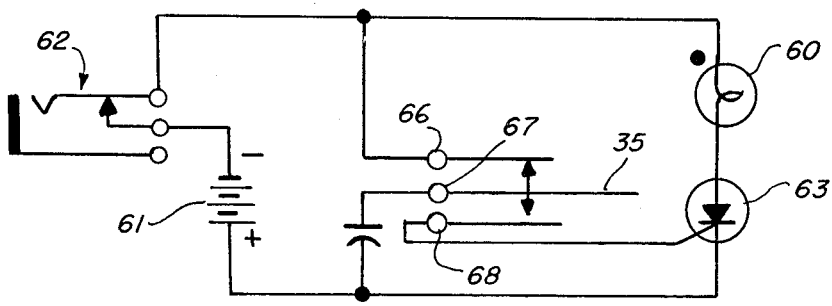

VEHICLE PARKING GUIDE AND ELECTRICAL SIGNALING DEVICE

The invention relates generally to a vehicle parking and signaling device which aids in parking a vehicle in a designated position in a garage, drive-in or the like establishment and which gives the driver of the vehicle notice when a vehicle has reached a designated position within a parking area.

Many devices have been disclosed for giving the driver of a vehicle notice when his vehicle has reached a predetermined position within a garage or parking area. Among the devices for giving a driver notice when his vehicle should be stopped to avoid damaging the car, the wall of the garage or other structure are the devices shown in U.S. Pat. Nos. 2,454,896 and 3,219,972. These devices have failed to achieve wide spread commercial acceptance, however, because of their cost and complexity.

It is therefore an object of the invention to provide an improved parking guide and signaling device for assisting in parking a vehicle.

It is a further object of the present invention to provide a vehicle parking guide and signaling device which provides a more dependable signal under indoor and outdoor conditions for use than like devices heretofore produced.

Other objects of the present invention will be apparent in the detailed description and claims to follow when read in conjunction with the accompanying drawing wherein:

FIG. 2 is a fragmentary vertical sectional view partially in elevation taken along the line 2—2 of FIG. 1.

FIG. 3 is a horizontal sectional view partially in plan taken along the line 3—3 of FIG. 2.

FIG. 4 is a fragmentary vertical sectional view partially in elevation of the device of FIG. 2 in a different operative position.

FIG. 6 is a schematic diagram of the electrical circuit used in the present invention.

Figure 1:
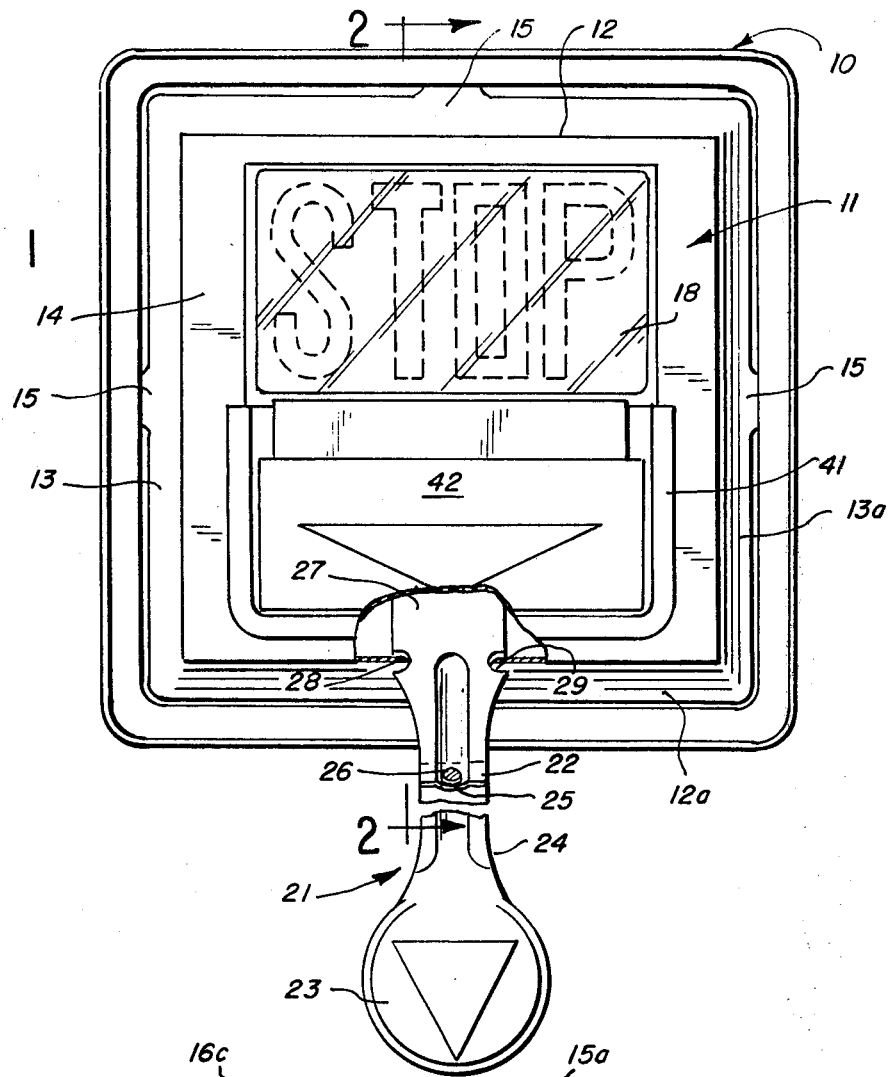
FIG. 1 is a front elevational view of a parking guide and signaling device embodying the present invention.
Figure 5:
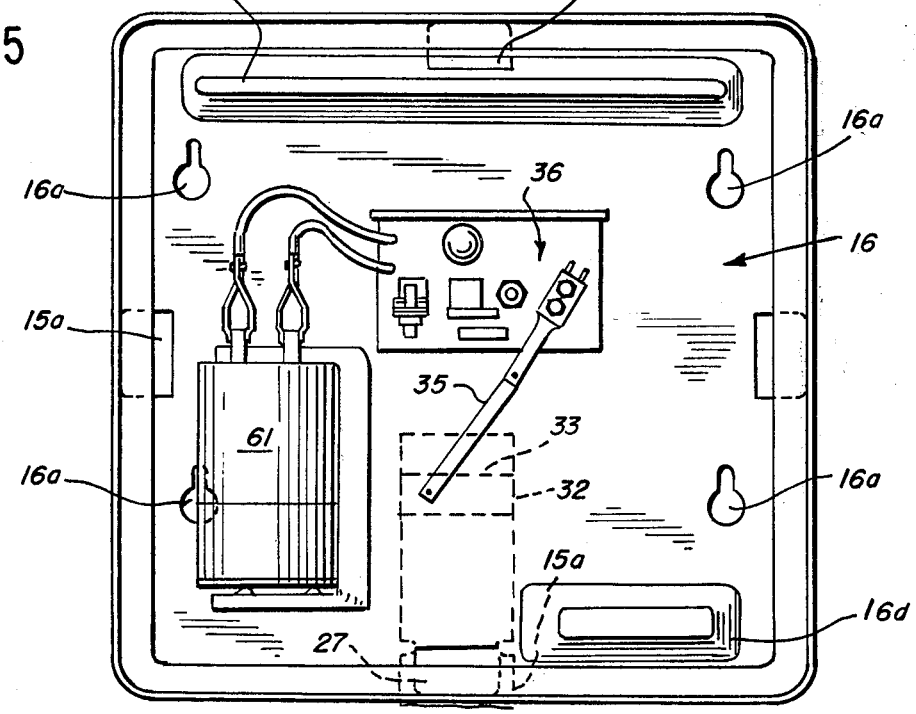
FIG. 5 is a rear elevational view partially in vertical section taken along the line 5—5 of FIG. 2.

The objects of the invention are achieved by providing a vehicle parking guide and signaling device 10 comprising a generally rectangular housing section 11, including upper and lower walls 12, 12a, lateral walls 13, 13a and front wall 14. The tabs 15 extending perpendicularly from the lower edges of the walls 12, 12a, 13, 13a are adapted to detachably engage in slots 15a formed in a backing plate 16 which comprises the rear wall of the device 10. Any suitable mounting means for securing the signaling device 10 to a vertical wall or post are provided on the backing plate 16, as by fasteners extending through the apertures 16a or strips of pressure sensitive tape 16b on the back of plate 16. The backing plate 16 also preferably has formed thereon upwardly and inwardly tapered guide members 16c, 16d, respectively, extending parallel to the upper and lower walls 12 and 12a, respectively. The guide members 16c, 16d, assist in mounting the housing section 11 on the backing plate 16.

The front wall 14 is provided with a rectangular opening or window 17 which extends substantially the width of the upper portion of the front wall 14 with a transparent or translucent plastic or glass pane 18 supported by a flange 19 formed around the opening 17 in the front wall 14.

The lower wall 12a of the housing 11 is provided with a longitudinally extending slot 20 at about the midpoint of the wall 12a through which an actuating lever 21 extends. The actuating lever 21 is preferably formed of a plurality of generally flat interconnecting sections 22, 24, each of which has a small hole 25 formed adjacent the ends thereof to receive a fastener member 26 which secures the overlapping ends of the sections 22, 24, so that the actuating lever 21 has the desired length. The upper section 22 has an enlarged section 27 which is provided with rounded support surfaces 28, 29 formed at the lower end thereof which are adapted to pivotally engage the opposite ends of the slot 20 formed in the lower wall 12a.

The upper section 22 has mounted on the back surface at the upper end of the actuating lever 21 a weight element 32 which serves to bias the actuating lever 21 so that the upper end thereof normally extends upwardly and is adapted to move pivotally rearwardly until making contact with the backing plate 16. The weight element 32 has a bearing surface 33 formed on the rear wall surface thereof, preferably in the form of a dished out portion extending about half the width thereof, which is adapted to engage the lower end of an electrical switch actuating arm 35 which is adapted to hold an electrical switch means 36 open so that no electric current will flow therethrough while the actuating lever is in its normal "at rest" position, as best shown in FIG. 2.

The lower end of the actuating lever 21 extends downwardly and normally forwardly from the housing section 11 as a result of the biasing weight 32 mounted on the enlarged upper section 22 of the actuating lever 21. The length of the actuating lever 21 is such that the lower end section 24 or lower arm which preferably has an enlarged target section 23 formed thereon as an aid in centering the vehicle in the parking area will be engaged by the bumper of the vehicle being parked as the vehicle approaches the desired final parking position and will pivotally move the upper end of the actuating lever 21 forwardly toward the pane 18 and out of contact with the switch actuating arm 35 when the vehicle is in the designated parking space. The lever arm 21 is preferably formed of a material which is readily yieldable and resilient so that it has a high degree of flexibility to permit the vehicle moving a distance beyond the designated parking spot without causing any damage to the actuating lever 21 or the other parts of parking guide 10.

Mounted on the inner surface of the front wall 14 and enclosing the edges of the pane 18 is a reflector means 50 comprising a truncated semi-spherical member 51 having a small circular passage formed at the center thereof to accommodate an electric bulb 10 therein. The outer surface of the reflector means 50 is provided with a reflective, mirror-like surface coating 54. When the resilient switch means 36 is allowed to close and electric current flows to illuminate the bulb 60, an intense beam of light is directed from the reflective surface coating 54 onto the rear surface of the pane 18 so that indicia 34 on the surface of the pane 18 are clearly visible when viewed from the front of the apparatus.

The front wall 14 of the housing 11 is also preferably provided with one or more compartments or receptacles 40 for holding advertising literature or messages for the driver of the vehicle. As best shown in FIGS. 1 and 2, the receptacle 40 is formed of a "U"-shaped strip 41 mounted on the lower portion of the front wall 14 with a flat strip 42 extending across the front edges of the "U"-shaped strip to provide the front wall of the receptacle 40.

In FIG. 6 an electrical circuit is shown illustrating one means for controlling the electric light bulb 60. The electric circuit comprises a source of electricity, such as battery 61, or when 110 voltage electricity is available, a conventional converter unit 62 is provided. The battery 61 is in series with the light bulb 60 and a triac 63 which is triggered "on" by a pulse supplied by the condenser 65 when the resilient switch arm 36 is allowed to move out of contact with terminal 66 and bring the terminals 67, 68, into electrical contact. The light bulb 60 is a flasher bulb, such as a General Electric Co. Bulb No. 455 having means for turning itself "off" after a predetermined period, such as 5 seconds, and remaining "off" during the balance of the period the actuating arm 36 maintains terminals 67, 68 in contact and will not again turn "on" until the triac 63 is again triggered.

It should be understood that a buzzer or other electrical signaling means can be placed in series with the light bulb 60, if desired. Also, an electrical circuit leading to a signaling board in a location remote from the parking area can be connected in a series with the light bulb 60.

We claim:

1. A vehicle parking guide and signaling device comprising a housing section adapted to be supported in a vertical position on a backing plate in a parking area and having a front wall with an opening therein, said opening being closed by a pane of light transmitting material adapted to support indicia on the surface thereof, means supported on said backing plate and extending into said housing section comprising an electrical circuit with a light bulb and resilient switch means normally in closed position, said resilient switch means having a switch actuating means, lever means pivotally supported between the ends thereof by the housing section in an opening formed in the lower wall of said housing section, said lever means having on the upper end a biasing weight with a bearing surface which normally engages said switch actuating means and holds said resilient switch means in open position, reflector means supported within said housing section which in combination with said light bulb is adapted to provide an intense beam of light on the inner surface of said pane when said circuit is closed, and said lever means being movable out of contact with the said switch actuating means by the bumper of a vehicle to allow said switch means to close said electrical circuit; whereby an intense beam of light illuminates the inner surface of said pane when said lever means is pivotally moved rearwardly by the bumper of a vehicle as said vehicle moves into a designated position into a parking area.

* * * * *